March 14, 1967

W. S. EMMERICH 3,309,545

GASEOUS INSULATION FOR MAGNETOHYDRODYNAMIC
ENERGY CONVERSION APPARATUS

Filed July 17, 1962

WITNESSES:
Bernard R. Gieguey
James T. Young

INVENTOR
Werner S. Emmerich
BY
ATTORNEY

United States Patent Office 3,309,545
Patented Mar. 14, 1967

3,309,545
GASEOUS INSULATION FOR MAGNETO-
HYDRODYNAMIC ENERGY CONVER-
SION APPARATUS
Werner S. Emmerich, Churchill Borough, Pittsburgh, Pa.,
assignor to Westinghouse Electric Corporation, East
Pittsburgh, Pa., a corporation of Pennsylvania
Filed July 17, 1962, Ser. No. 210,408
2 Claims. (Cl. 310—11)

The present invention relates to energy conversion apparatus, and more particularly to thermal to electrical magnetohydrodynamic energy conversion apparatus.

The conventional process of generating electrical energy comprises moving metallic conductors through a magnetic field. Generally, the energy conversion is from thermal to mechanical to electrical energy. Electrical energy can also be generated by moving fluid conductors in a magnetic field. However, in order to have a direct conversion from thermal to electrical energy, it is necessary to use a gas in order to realize an appreciable volume change. Large quantities of electrical energy may be efficiently generated through the use of magnetohydrodynamic (MHD) techniques. A magnetohydrodynamic generator utilizes an electrically conducting working fluid, generally a noble gas or a gas containing combustion products, which is thermally ionized and seeded with an alkali metal to make the gas more electrically conductive. The ionized gas is passed through a duct formed by electrically conducting electrodes on two sides and insulating walls disposed therebetween. A magnetic field is provided transverse to the flow of the working fluid such that current is generated as the electrically conducting working fluid passes through the magnetic field at substantially right angles thereto.

The general theory and operation of a magnetohydrodynamic generator is fully described in copending application Ser. No. 202,714, filed June 15, 1962, by Stewart Way and assigned to the same assignee as the present invention. As disclosed in the above copending application in order to obtain an efficient cycle of operation, it is necessary that the thermally ionized gas be maintained in a highly electrically conductive state. Thus, the gas must be kept at a temperature of the order of 2500° K. Electrical insulating materials which may be used as the side walls between the current collecting electrodes must have unusual characteristics in order to withstand the prevailing conditions in the duct. Such materials must retain their insulating properties at the very high temperatures which exist in the duct, and must also be chemically resistant to the gas and alkali seeding materials contained in the flow. Moreover, the wall materials must be structurally sound to withstand the effects of pressure and ablation due to the high velocity of the flow. Furthermore, the surfaces of the wall members adjacent the flow of gas must have exceedingly low coefficients of friction; otherwise, stagnant layers of the electrically conducting gas will accumulate near the side walls between the electrodes. These boundary layers of gas moving at relatively low velocity would provide a path for electric current to flow directly between the electrodes and cause short circuits.

It is, therefore, an object of the present invention to provide new and improved magnetohydrodynamic energy conversion apparatus in which short circuits between the electrodes are eliminated.

A further object of the present invention is to provide new and improved magnetohydrodynamic energy conversion apparatus in which an insulating layer of coolant gas is provided adjacent side walls to eliminate short circuits.

It is still a further object of the present invention to provide new and improved magnetohydrodynamic energy conversion apparatus in which the wall members are protected against high temperatures, pressures and deleterious effects of seeding materials.

Broadly, the present invention accomplishes the above cited objects by providing magnetohydrodynamic energy conversion apparatus wherein a flow of thermally ionized working fluid is passed through a duct formed by electrically conducting electrodes and wall members. An insulating layer is provided to the wall members to protect the wall members, as well as eliminating short circuits between the electrodes due to stagnant accumulations of working fluid.

These and other objects will become more apparent when considered in view of the accompanying specification and drawing, in which.

Figure 1:
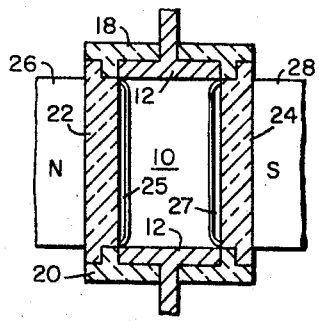
FIGURE 1 is a transverse sectional view of one embodiment of the present invention.
Figure 2:
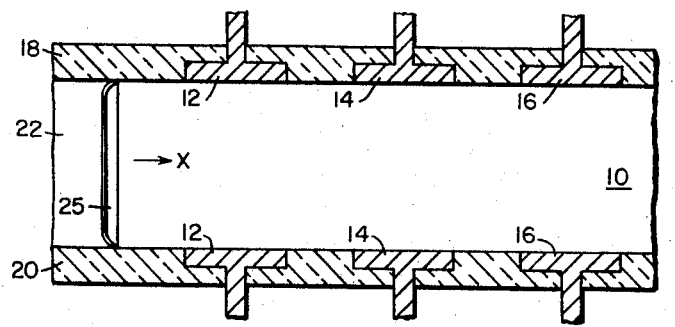
FIG. 2 is a longitudinal sectional view of the embodiment of FIG. 1.

Referring to FIGS. 1 and 2, a magnetohydrodynamic generator chamber is shown having a duct 10 through which a thermally ionized working fluid is passed in the X direction. The ionized working fluid may, for example, be a combustion product gas, which is seeded with an alkali metal, such as potassium, cesium or rubidium, in order to make the gas a better electrical conductor. Placed along the duct 10 and adjacent to the flow of working fluid are the electrically conducting electrode pairs 12, 14 and 16, which are held in place through the top insulating member 18 and the bottom insulating member 20. Electrical conections are made to the electrodes through the insulating members 18 and 20 and to an external load, not shown. The insulating side wall members 22 and 24 are disposed between the electrodes to form the other boundaries of the duct 10. The insulating material for the top, bottom and side wall members may be, for example, zirconium oxide or magnesium oxide. The magnetic pole members 26 and 28 are placed adjacent the wall members 22 and 24 to provide a transverse magnetic field to the flow of working fluid through the duct 10. Thus, as the electrically conducting working fluid passes through the transverse magnetic field a current is generated, which is collected by electrode pairs 12, 14 and 16.

Figure 3:
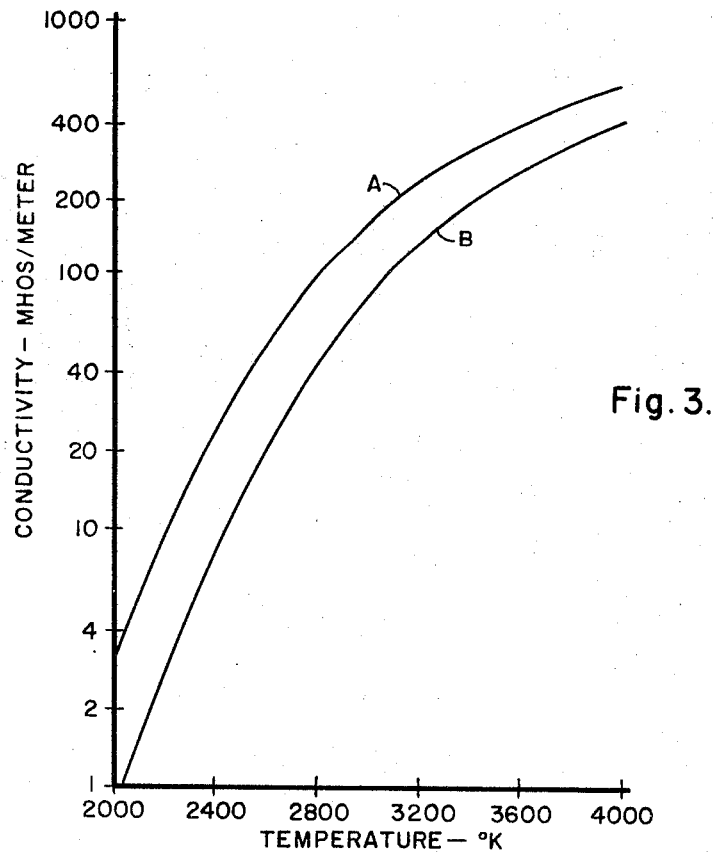
FIG. 3 is a plot of the electrical conductivities of an ionized working fluid as a function of temperature.

FIG. 3 shows a plot of electrical conductivity as a function of temperature for combustion product gases seeded with an alkali metal. Curve A is a plot of a combustion product gas with a seeding of .04 atmosphere of cesium. Curve B is a plot of a combustion product gas seeded with .04 atmosphere of potassium. It can be seen from the curves that the conductivity of the seeded gas almost doubles for each hundred degrees increase in temperature. Thus, by cooling the working fluid adjacent the surfaces of the side wall members, that portion of the working fluid may change from a highly conductive to a relatively low conducting state so that it may serve as an insulating material between the electrode pairs. Or, if a layer of cool and non-seeded gas were provided between the flow of working fluid and the side walls 22 and 24, a protective non-conducting layer would be provided therebetween. This layer of gas would serve to protect the side wall members 22 and 24, provide a smooth surface for the flow of working fluid, and cool the working fluid adjacent thereto to a lower electrical conductivity. Thus, any short circuits that might exist between the electrodes woud be eliminated by this insulating barrier.

Referring again to FIGS. 1 and 2, to provide a layer of coolant gas along the wall members 22 and 24, the nozzles 25 and 27 are disposed upstream of the electrode pair 12, at the entrance into the duct 10 of the generator chamber. Through the nozzles 25 and 27 is then introduced into the duct, a gas, such as air, which flows along the inside of the duct 10 adjacent to the wall members 22 and 24 to provide an insulating layer between the electrode pairs 12, 14 and 16 and the flow of working fluid. The coolant gas may be supplied by conventional compressor means which are well known in the art and therefore not further described herein. The coolant gas should be unseeded, and may be at room temperature, in that a slight reduction of the temperature of the working fluid adjacent the wall members 22 and 24 will cause the working fluid to become substantially non-conducting.

Figure 4:
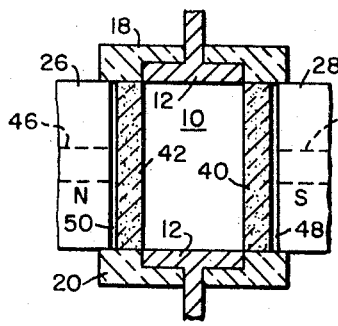
FIG. 4 is a transverse sectional view of another embodiment of the present invention.
Figure 5:
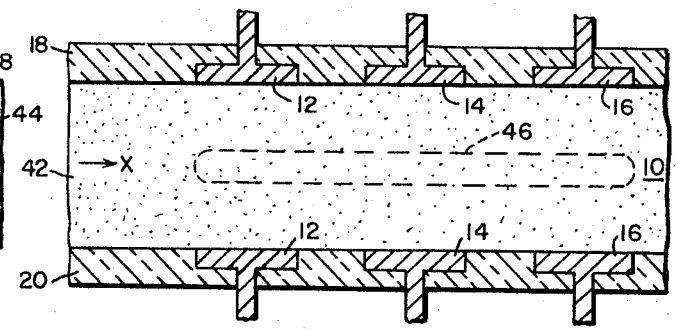
FIG. 5 is a longitudinal sectional view of the embodiment of FIG. 4.

In FIGS. 4 and 5, porous side walls 40 and 42 are disposed about the duct 10 between the electrode pairs 12, 14 and 16. The porous side wall material for the wall members 40 and 42 many comprise a ceramic material such as porous zirconium oxide. To provide a layer of coolant gas between the flow of the working fluid and the inside surfaces of the wall members 40 and 42, a coolant gas such as air is introduced through the orifices 44 and 46 into the open areas 48 and 50. The air then passes through the pores of the wall members 40 and 42 into the duct 10 and so provides a protective layer adjacent the inner surfaces of the wall members. The other portions of the embodiment of FIGS. 4 and 5 are substantially the same as that of FIGS. 1 and 2. The manufacture of porous insulating materials such as zirconium oxide are well known in the art and will not be discussed further herein. Thus, by supplying a flow of air for example from compressing means, through the orifices 44 and 46, the air may pass through the porous wall members 40 and 42 into the flow of working fluid to cool the working fluid, and also provide an insulating layer between the electrode pairs.

Figure 6:
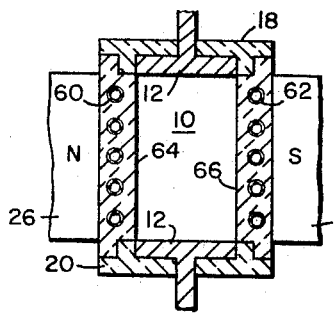
FIG. 6 is a transverse sectional view of another embodiment of the present invention.
Figure 7:
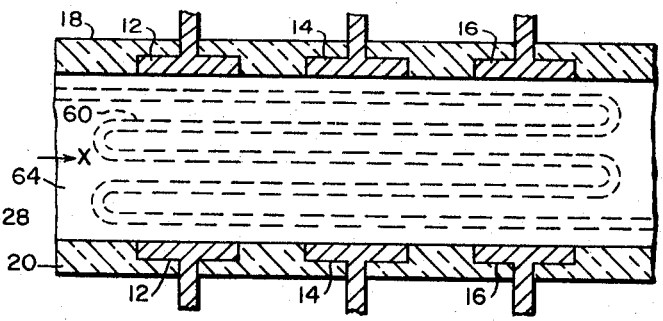
FIG. 7 is a longitudinal sectional view of the embodiment of FIG. 6.

The embodiment of FIGS. 6 and 7 shows tubular coils 60 and 62 disposed adjacent to the wall members 64 and 66, respectively, which are disposed about the duct 10 between the electrode pairs 12, 14 and 16. Through the tubular coils 60 and 62 are passed a suitable cooling fluid. The apparatus for providing a cooling cycle is well known in the art and will not be described herein. Thus, by passing a cooling fluid through the coils 60 and 62 the wall members 64 and 66 will be cooled. In turn, the working fluid passing adjacent to the surfaces of the wall members 64 and 66 will be cooled to such an extent that it will change from its highly electrically conducting state to one that is substantially non-conducting or an insulating state. With the wall members 64 and 66 being thus cooled, a non-conducting layer of working fluid will be provided between the electrode pairs 12, 14 and 16 such that the working fluid itself will serve as a protective layer for the wall members 64 and 66. Short circuits will be prevented between the electrode pairs because the temperature of the working fluid adjacent the walls has been lowered to its insulating state. No short circuit paths exist between the electrode pairs, but rather a high resistance path of the cool, non-conducting working fluid. Thus, as the main portion of the working fluid passes through the transverse magnetic field provided by the magnetic poles 26 and 28, electric current will be generated due to the passage of the electrically conducting working fluid therethrough, and will be collected by the electrode pairs 12, 14 and 16. However, the portion of the working fluid that passes adjacent to the wall members 64 and 66 will be cooled to such an extent by the cooling effect of the cooling fluid passing through the tubular coils 60 and 62 that this portion of the flow will become non-conducting, and provide the desired insulating layer between the electrode pairs 12, 14 and 16.

Although the present invention has been described with certain particularity, it should be understood that the present disclosure has been made only by way of example and that numerous changes in the details of construction, the materials used and the combination or arrangement of parts may be resorted to without departing from the scope and spirit of the present invention.

I claim as my invention:

1. In thermal to electrical energy conversion apparatus operative with a flow of working fluid and a coolant gas, the combination of: a generator member including opposed side and opposed electrode bearing wall members to form a duct through which said flow of working fluid may pass; a plurality of electrically conducting electrodes disposed on said electrode bearing wall members and adjacent said flow of working fluid; said side wall members comprising a porous material; and cooling means to supply said coolant gas to said porous side wall members so that said coolant gas may pass therethrough into said duct to form a layer of coolant gas between each of said side wall members and said flow of working fluid.

2. In magnetohydrodrodynamic thermal to electrical energy conversion apparatus operative with a flow of thermally ionized working fluid and a coolant gas, the combination of: a generator member including opposed side and opposed electrode bearing wall members to form a duct through which said flow of working fluid may pass; a plurality of electrically conducting electrode pairs disposed on said electrode bearing wall members and adjacent said flow of working fluid; said side wall members comprising a porous material; and cooling means to supply said coolant gas to said side wall members so that said coolant gas may pass therethrough into said duct to provide a layer of coolant gas between each of said side wall members and said flow of working fluid.

References Cited by the Examiner

UNITED STATES PATENTS

| 1,530,468 | 3/1925 | Elliott | 210—11 |
| 2,658,332 | 11/1953 | Nicholson | 253—39 |
| 3,048,966 | 8/1962 | Feraud | 310—11 X |
| 3,099,131 | 7/1963 | Roas | 210—11 X |
| 3,248,578 | 4/1966 | Brill | 310—11 |

FOREIGN PATENTS 335,901  3/1959  Switzerland.

OTHER REFERENCES

Publication: MHD Generators by S. Way: Westinghouse Engineer July 1960: pp. 105 to 107.

MILTON O. HIRSHFIELD, *Primary Examiner.*

D. X. SLINEY, *Assistant Examiner.*